United States Patent [19]

Grove

[11] 4,433,323

[45] Feb. 21, 1984

[54] GROUND PROXIMITY WARNING SYSTEM WITH TIME AND ALTITUDE BASED MODE SWITCHING

[75] Inventor: Michael M. Grove, Bellevue, Wash.

[73] Assignee: Sundstrand Data Control, Inc., Rockford, Ill.

[21] Appl. No.: 345,891

[22] Filed: Feb. 4, 1982

[51] Int. Cl.³ ............................................. G08B 23/00
[52] U.S. Cl. ................................. 340/970; 73/178 T;
364/427; 364/433; 340/963
[58] Field of Search .......... 340/27 R, 27 AT, 27 NA;
244/180; 73/178 R, 178 T; 343/7 TA, 112 A,
343/112 CA; 364/427, 433, 428

[56] References Cited

U.S. PATENT DOCUMENTS 3,934,221 1/1976 Bateman et al. ............... 340/27 AT

Primary Examiner—James J. Groody

Attorney, Agent, or Firm—Ted E. Killingsworth; Michael B. McMurry; Harold A. Williamson

[57] ABSTRACT

To increase the effectivity of warnings and to decrease nuisance warnings in a ground proximity warning system having several modes of operation, the switching from one mode to another is done as a function of radio altitude and time. In addition, in a ground proximity warning system where a warning signal is generated in accordance with a predetermined relationship between flight parameters, one or more of these parameters can be varied as a function of radio altitude and time in order to, for example, increase the altitude above ground as a function of radio altitude and time from take-off that a terrain clearance warning is generated or to decrease as a function of radio altitude and time, the radio altitude below which a negative climb after take-off warning is generated.

32 Claims, 9 Drawing Figures

GROUND PROXIMITY WARNING SYSTEM WITH TIME AND ALTITUDE BASED MODE SWITCHING

TECHNICAL FIELD

This invention relates to the field of aircraft ground proximity warning systems and, in particular, to systems with more than one mode of operation.

BACKGROUND OF THE INVENTION

Ground proximity warning systems as presently used in commercial aircraft have five or six modes of operation. A mode of operation refers to the criteria that is used to generate a pilot warning. For example, in a terrain closure mode of operation the altitude of the aircraft above the ground is compared with the rate of closure of the aircraft to the ground and if the closure rate exceeds a predetermined rate for a particular altitude above the ground, a warning is generated. This particular mode of operation is illustrated in U.S. Pat. Nos. 3,715,718, 3,936,796, 3,934,222 and 3,958,218.

Other warning modes include: negative climb after take-off, terrain clearance, excessive sink rate and below glide slope warning modes. A ground proximity warning system employing these types of warning modes is described in U.S. Pat. No. 3,946,358. In the type of ground proximity warning system described in this patent, various warning modes are used depending upon the phase of aircraft flight. During take-off, for instance, the negative climb after take-off mode is activated which will generate a warning if the aircraft should descend with respect to barometric altitude before reaching 700 feet above ground level. Various forms of this warning mode are illustrated in U.S. Pat. No. 3,947,810 and Bateman U.S. patent application Ser. No. 109,580, filed Jan. 4, 1980 now U.S. Pat. No. 4,319,218 as well as in U.S. Pat. No. 3,946,358. After the aircraft has reached an altitude of 700 feet above ground level the ground proximity warning system will switch from the negative climb after take-off mode to a terrain clearance mode which provides a pilot warning in the event the aircraft should descend below a predetermined altitude with respect to the ground. Along with U.S. Pat. No. 3,946,358, U.S. Pat. Nos. 3,944,968 and 4,030,065 describe terrain clearance type warning modes. This mode normally remains in operation until the aircraft is placed in a landing configuration with the landing gear and flaps lowered.

The applicant believes that the warning coverage of the ground proximity warning system can be enhanced by changing the criteria by which the switch from the negative climb after take-off mode to the terrain clearance mode is made. Specifically, this change relates to the set of circumstances where the aircraft takes off over terrain that is sloping upwardly and the aircraft does not reach 700 feet above the ground to activate the terrain clearance mode as required in the prior art systems. As a result, the aircraft could approach the ground while still climbing with respect to barometric altitude without a warning being generated.

In addition, it has been discovered that it is possible under certain conditions for a prior art system to get a nuisance or an unwanted warning in the event, for example, the aircraft climbs above 700 feet above ground thereby switching the ground proximity warning system into the terrain clearance mode but the aircraft speed is such that the terrain clearance mode will generate a warning at 1000 feet or below. Since the aircraft is at about 700 feet when the switch in modes occurs, a warning will be generated which may not be warranted by the circumstances.

SUMMARY OF THE INVENTION

It is therefore an object of the invention to provide a ground proximity warning system having at least two warning modes with improved warning coverage wherein switching from one mode to another is done as a function of radio altitude and time.

It is another object of the invention to provide a ground proximity warning system with improved warning coverage wherein a warning is generated in accordance with a predetermined relationship between flight parameters and the predetermined relationship is varied as a function of radio altitude and time.

It is a further object of the invention to provide a ground proximity warning system with improved warning coverage having a first warning mode wherein a warning is generated when the aircraft is descending with respect to barometric altitude during take-off when the aircraft is below a first predetermined radio altitude where this first predetermined altitude is decreased as a function of increasing radio altitude and time and a second warning mode wherein the warning signal is generated when the aircraft descends below a second predetermined radio altitude where the second predetermined radio altitude is increased as a function of increasing radio altitude and time.

DETAILED DESCRIPTION OF THE INVENTION

Figure 1:
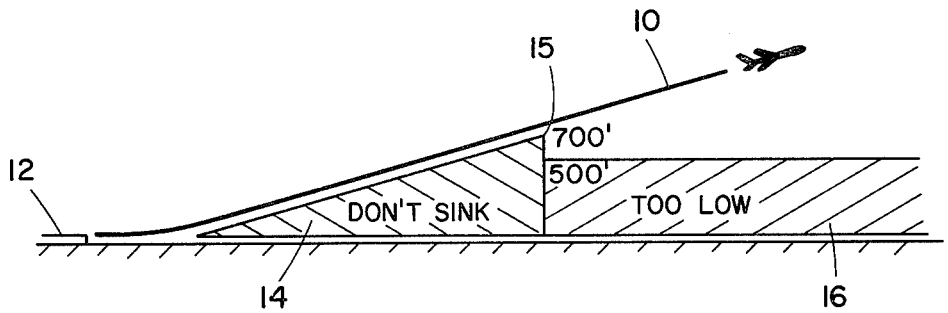
FIG. 1 is a graphical representation of a first aircraft flight path illustrating a mode switching operation of a prior art ground proximity warning system.

To illustrate the operation of a prior art ground proximity warning system having a number of different operating modes of the type disclosed in U.S. Pat. No. 3,946,358, a flight path 10 of an aircraft taking off from an airport runway 12 is shown in FIG. 1. During the take-off phase of flight, the ground proximity warning system is operating in a negative climb after take-off mode as represented by the first shaded area 14 under the flight path 10. If the aircraft should descend with respect to barometric altitude at a greater than a predetermined rate in accordance with the negative climb after take-off warning mode described in U.S. Pat. No. 3,946,358 or if the aircraft should lose a predetermined amount of altitude in accordance with the negative climb after take-off warning mode described in U.S. Pat. No. 3,947,810 and U.S. patent application Ser. No. 109,580 before the aircraft reaches an altitude of 700 feet above ground level, a voice warning typically using the words "don't sink" will be generated. After the aircraft achieves an altitude of 700 feet above ground, the ground proximity warning system will switch at point 15 from the negative climb after take-off off warning mode to the terrain clearance warning mode as represented by the second shaded area 16 in FIG. 1. In the terrain clearance mode, a voice warning such as "too low, terrain" is generated when the aircraft descends below a predefined altitude with respect to the ground. Terrain clearance warning modes are described in U.S. Pat. Nos. 3,946,358, 3,944,968 and 4,030,065.

Figure 2:
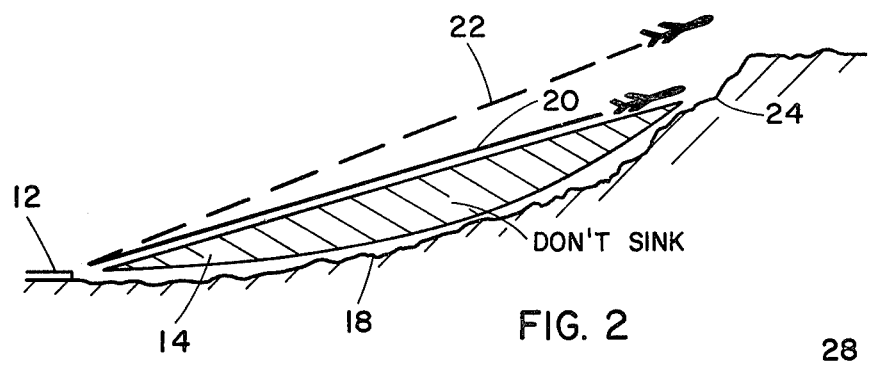
FIG. 2 is a graphical representation of a second aircraft flight path over rising terrain illustrating operation of the prior art ground proximity warning system.

The warning system as illustrated in FIG. 1 works quite well for most situations. However, the applicant believes that the mode switching arrangement shown in FIG. 1 could be modified to generate a warning under circumstances in addition to those circumstances that produced warnings in prior art systems. An example of the set of circumstances for which the system can be improved so as to provide a timely warning is illustrated in FIG. 2. In this situation the terrain at 18 is sloping in an upward direction approximately parallel to an aircraft flight path 20. The flight path that the aircraft would normally be expected to follow is indicated by the dashed line 22 but it is assumed for this example that the aircraft is inadvertently flying on the lower flight path 20. Since the aircraft flight path 20 never is greater than 700 feet above ground level, the prior art ground proximity warning system will not switch from the negative climb after take-off mode 14 to the terrain clearance mode 16 as shown in FIG. 1. As a result, since the aircraft is gaining barometric altitude, there will not be a warning generated before the aircraft approaches the terrain 18 at point 24.

Figure 3:
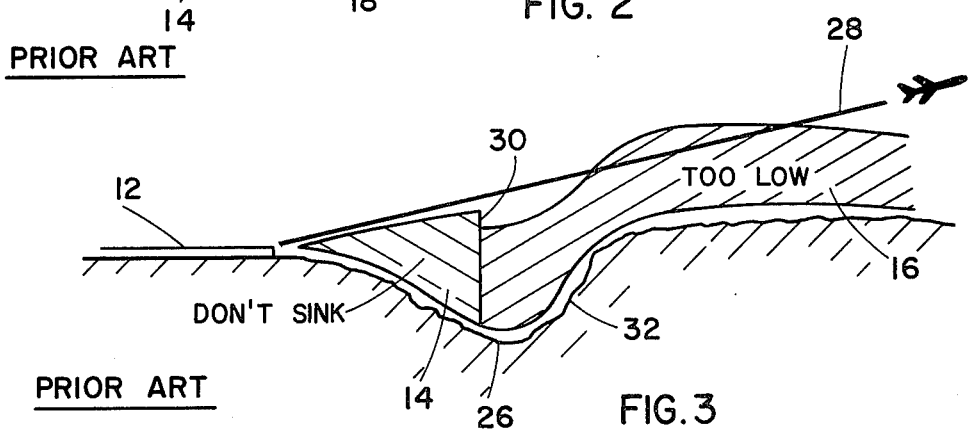
FIG. 3 is a graphical representation of a third aircraft flight path over terrain having a drop illustrating the mode switching operation of the prior art ground proximity warning system.

A set of circumstances in which a nuisance warning would be generated by the system in FIG. 1 is illustrated in FIG. 3 where there is a substantial dip 26 in the terrain underneath the aircraft flight path 28 causing the ground proximity warning system to switch from the negative climb after take-off mode 14 to the terrain clearance mode 16 at point 30. On the other side 32 of the dip 26 where the terrain returns to approximately the level of the runway 12, a warning will be generated since the flight path 28 is below the altitude at which terrain clearance warnings 16 are generated. In effect, the dip 26 in the terrain will have caused the ground proximity warning system to have prematurely switched from the negative climb after take-off mode 14 to the terrain clearance mode 16.

Figure 4:
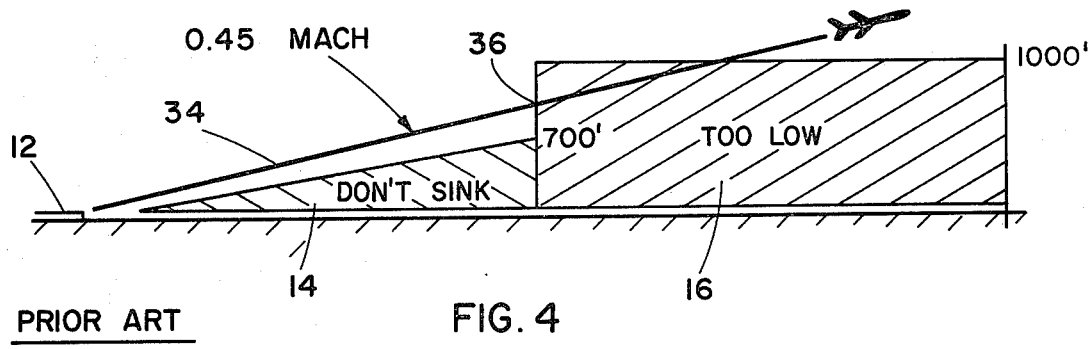
FIG. 4 is a graphical representation of a fourth aircraft flight path illustrating the mode switching operation of the prior art ground proximity warning system.

Another set of circumstances in which a nuisance warning can be generated over terrain is illustrated in FIG. 4. Such a warning will occur in a ground proximity warning system having a terrain clearance mode of the type described in U.S. Pat. No. 4,030,065 where the maximum altitude at which a warning 16 is given increases with speed. As an example, once the aircraft reaches a speed of mach 0.45, the maximum altitude at which a warning is given is increased to 1000 feet from the nominal level of 500 feet. As a result, when an aircraft having a flight path 34 accelerates to a speed of 0.45 mach before gaining an altitude of 700 feet above ground level, a nuisance warning will be generated at point 36 when the aircraft exceeds 700 feet of altitude.

To improve the ground proximity warning system described above, a mechanism for effectively switching from one operating mode to another based on the combination of aircraft radio altitude and time was developed. A block diagram for implementing the preferred embodiment of the invention is provided in FIG. 5. A source of signals to be used in the system is represented by an aircraft data bus 38. Flight parameter signals provided by the data bus 38 include: radio altitude $h_R$ on line 40; barometric altitude $h_B$ on line 42; barometric altitude rate $\dot{h}_B$ on line 44; a logic signal indicating that the aircraft is above 50 feet of radio altitude on line 46; logic signals GU and FU on lines 50 and 52 respectively indicating that the landing gear is up or that the flaps are up; and an aircraft speed signal calibrated in knots or mach on line 56.

The portion of the logic in FIG. 5 relating to the terrain clearance mode will be described first. The basic logic shown is similar to the logic shown in U.S. Pat. No. 4,030,065. In general operation the terrain clearance mode will generate a warning when the aircraft descends below a predetermined radio altitude when the aircraft is not in a landing configuration, that is with neither the flaps or landing gear down. The predetermined radio altitude, or altitude above the ground, which serves to generate the warning is preferrably varied as a function of the airspeed of the aircraft such that the predetermined radio altitude, or terrain clearance altitude, increases as the airspeed increases thereby providing ground proximity warnings at greater altitudes for greater speeds. It should be noted that the term "radio altitude" is used to denote aircraft altitude above ground since radio altimeters are typically used in aircraft to determine aircraft altitude above the terrain.

Figure 5:
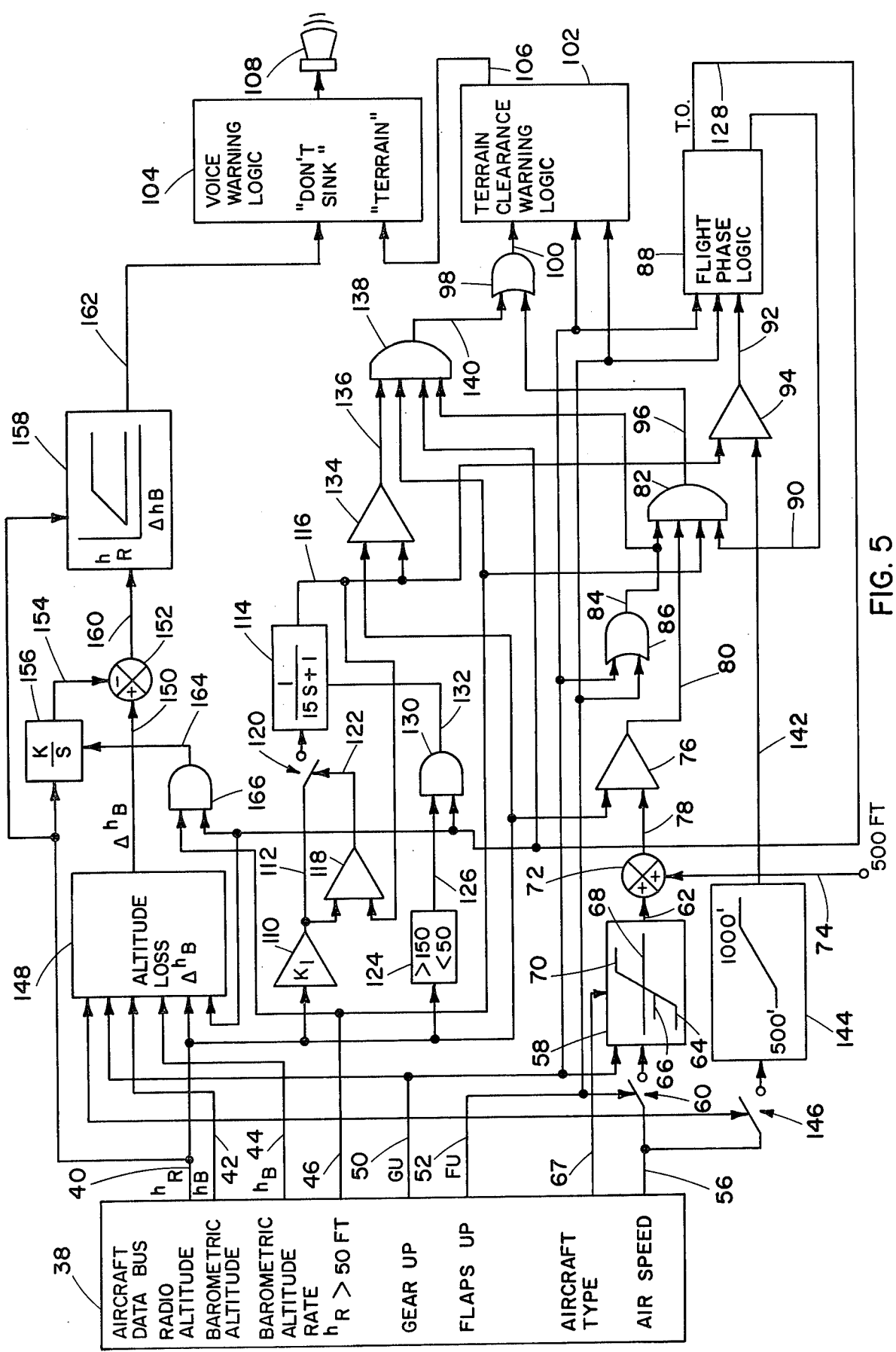
FIG. 5 is a functional block diagram of a ground proximity warning system utilizing a time based altitude signal for mode switching.

In the logic diagram of FIG. 5 a function generator 58 received airspeed information from line 56 through a switch 60 controlled by the flap signal on line 52. The position of the landing gear is also applied to the function generator 58 over line 50. The output of the function generator on line 62 will be equivalent to −350 feet at speeds of less than 0.28 mach with the landing gear down for turboprop type aircraft as indicated by line 64 and limited to a maximum of −300 feet at speeds of less than 0.29 mach with the landing gear down for other types of aircraft as indicated by line 66. Selection of the −350 foot limit or the −300 foot limit is typically made by an input on line 67 to the function generator 58 by a pin indicating the type of aircraft. When the landing gear is up the function generator 58 will provide a signal equivalent to zero feet for speeds equal to or less than 0.35 mach as shown by line 68 and increasing to a maximum value of 500 feet as speed increases to 0.45 mach as shown by line 70. Connected to the output line 62 of the function generator 58 is a summing junction 72 which receives a signal from a signal source representing 500 feet over a line 74. A comparator amplifier 76 receives the output of the summing junction 72 over line 78 and receives the $h_R$ signal over line 40. This circuit is similar to the terrain clearance logic shown in U.S. Pat. No. 4,030,065 in that a logic signal will be produced on the output line 80 of the comparator 76 when the aircraft descends below the terrain clearance altitude generated on line 78. The logic signal on line 80 is applied to a AND logic gate 82 along with a signal on line 46 indicating that the aircraft is more than 50 feet above the ground and a logic signal on line 84 from an OR logic gate 86 indicating that either the flaps or the landing gear is up. In addition, an input is flight phase logic circuit 88 on a line 90 indicating that the aircraft is not in a take-off phase of flight.

In a ground proximity warning system it is necessary to determine what phase of flight the aircraft is in so that the most appropriate warning mode can be selected. Logic of the same general type indicated by the flight phase logic 88 is disclosed in U.S. Pat. Nos. 3,936,796 and 3,947,810. In addition to inputs representing flap and landing gear positions on lines 50 and 52, the flight phase logic 88 receives an input on line 92 from a comparator amplifier 94 that indicates that the aircraft has exceeded a combination of radio altitude $h_R$ and time such that the negative climb after take-off mode should be deactivated. Operation of this logic will be discussed in detail in connection with the description of the time based altitude signal.

Returning to the description of the logic gate 82, when the aircraft descends below the terrain clearance altitude generated on line 78 and when either or both of the flaps or landing gear are up; and the aircraft is not in the take-off phase of operation, a logic signal will be generated on a line 96 which is applied through an OR logic gate 98, over a line 100 to a terrain clearance warning logic circuit 102. Additional inputs representing flap and landing gear position are applied to the terrain clearance warning logic 102 on lines 50 and 52. Logic outputs from the terrain clearance warning logic 102 are transmitted to a voice warning logic circuit 104 by means of line 106. Operation of a suitable terrain clearance logic circuit in combination with voice warning logic is described in detail in U.S. Pat. No. 4,030,065 and U.S. patent application Ser. No. 259,131. The terrain clearance warning logic 102 and the voice warning logic 104 will cooperate to produce the appropriate voice warning to the pilot by means of voice generating means such as a speaker 108. Typical voice warnings include short statements such as "too low, terrain," "too low, gear," and "too low, flaps."

During the take-off phase of operation a modified terrain clearance mode is provided in the preferred embodiment of the invention utilizing a time based altitude signal. As shown in FIG. 5, the radio altitude signal $h_R$ on line 40 is input to an amplifier 110 having a gain factor $K_1$ of 0.75. The output of the amplifier 110 on line 112 which represents seventy-five percent of the value of $h_R$ is applied to a single pole filter 114 having a time constant of 15 seconds. Since the filter 114 is a one-way charging circuit the value of the signal on line 116 will remain equal to or less than 0.75 of the maximum radio altitude achieved by the aircraft. A comparator amplifier 118 having the 0.75 $h_R$ signal 112 and the output 116 of the filter 114 as inputs, serves to close a switch by means of a logic signal on line 122 when the 0.75 $h_R$ signal is greater than the signal on line 116 so that the output of the filter 114 on line 116, which can be termed a time based altitude signal, will increase with increasing radio altitude.

In order to enable the filter circuit 114, a logic circuit 124 generates, in response to the radio altitude signal $h_R$ on line 40, a logic signal on line 126 which indicates that the aircraft has gained more than 150 feet of radio altitude. The logic signal on line 126 is combined with a logic signal on line 128 from the flight phase logic 88 in an AND gate 130 to enable the filter circuit 114 by means of a logic signal on line 132 when the aircraft has gained more than 150 feet in a take-off phase of operation. In addition, the logic circuit 124 will serve to reset the filter 114 output on line 116 to zero when the aircraft descends below 50 feet of radio altitude.

A terrain clearance warning logic signal is provided during take-off when the time based altitude signal on line 116 exceeds the $h_R$ signal on line 40. A comparator amplifier 134 compares the signals on lines 116 and 40 and when the time based altitude signal exceeds $h_R$, a logic signal is produced on line 136. Thus the time based altitude signal on line 116 serves as a floor which tends to increase with both time and altitude when the aircraft is taking off.

The logic signal on line 136 is applied to an AND gate 138 along with the greater than 50 foot $h_R$ signal on line 46, the take-off signal on line 128 and the landing gear or flaps up signal on line 84. As a result, the AND gate 138 will produce a warning logic signal on line 140 when the aircraft descends below the time based altitude floor during take-off thereby extending terrain clearance protection during the take-off phase of operation.

The time based altitude signal on line 116 also serves as an input to the comparator amplifier 94. A second input to the comparator 94 is received over line 142 from a function generator 144 that in turn receives as an input the airspeed signal from line 56. A switch 146 is controlled by the flap position signal 146 on line 52. When the flaps are up the function generator will produce a signal on line 142 that has a minimum value of 500 feet at 0.35 mach or below and increases linearly to 1000 feet at 0.45 mach or above. The comparator amplifier 94 will thus cause the flight phase logic to remove the take-off logic signal from line 128 when the time based altitude signal on line 116 exceeds the value of the signal on line 142. This has the effect of switching off the take-off logic signal on line 128 when the aircraft radio altitude has exceeded 500 to 1000 feet, depending upon airspeed, by at least a factor of 1.33.

A negative climb after take-off warning function utilizing a time based altitude signal is provided by the logic in the upper portion of FIG. 5. A signal $\Delta h_B$ representing the aircraft's net loss of barometric altitude $h_B$ is generated by a circuit 148 that accepts as inputs: radio altitude $h_R$ on line 40, barometric altitude $h_B$ on line 42, barometric altitude rate $\dot{h}_B$ on line 44; and flaps and landing gear position information on lines 50 and 52. Suitable logic for implementing the circuit 148 is disclosed in U.S. Pat. No. 3,947,810. The $\Delta h_B$ signal is output on a line 150 which in turn is connected to a positive input of a summing junction 152. Connected to a negative terminal of the summing junction 152 in a line 154 from an integrator 156 preferably having an amplification constant on the order of $1.34 \times 10^{-3}$ 1/sec.

The input to the integrator 156 is the radio altitude signal $h_R$ on line 40 resulting in a signal on line 154 that increases both with time and radio altitude. This signal can also be termed a time based altitude signal. Although the preferred embodiment of the invention as shown in FIG. 5 utilizes two different time based altitude signals, specifically the signals generated on lines 116 and 154 having somewhat different characteristics, it should be appreciated that a single time based signal could be used for both warning modes.

A warning logic circuit 158 receives the output of the summing junction 152 over a line 160 as well as the radio altitude signal $h_R$ over line 40 and is effective to generate a warning signal on line 162 when the aircraft is in a take-off mode of operation and loses a predetermined amount of barometric altitude $h_B$ for a predetermined radio altitude $h_R$. Operation of this type of warning circuit is described in detail in U.S. Pat. No. 3,947,810 and U.S. patent application Ser. No. 109,580. In response to a warning signal on line 162 the voice warning logic 104 generates a voice warning which preferably includes the words "don't sink."

The effect of the time based altitude signal on line 154 is to bias the negative climb after take-off off warning such that a greater altitude loss $\Delta h_B$ after take-off is required to generate a warning as both radio altitude $h_R$ and time increase. To that end the integrator circuit is enabled over a line 164 by an AND gate 166 having as inputs the logic signal on line 46 indicating that the aircraft is over 50 feet above the ground and the take-off phase logic signal on line 128. Thus the integrator 156 serves to increase the amount of altitude loss $\Delta h_B$ required to generate a warning after the aircraft has achieved 50 feet of radio altitude during take-off. The concept of biasing the $\Delta h_B$ signal to increase the amount of altitude loss required as a function of radio altitude and time would equally apply to a negative climb after take-off warning mode utilizing barometric descent rate $h_B$ as disclosed in U.S. Pat. No. 3,936,796.

Figure 6:
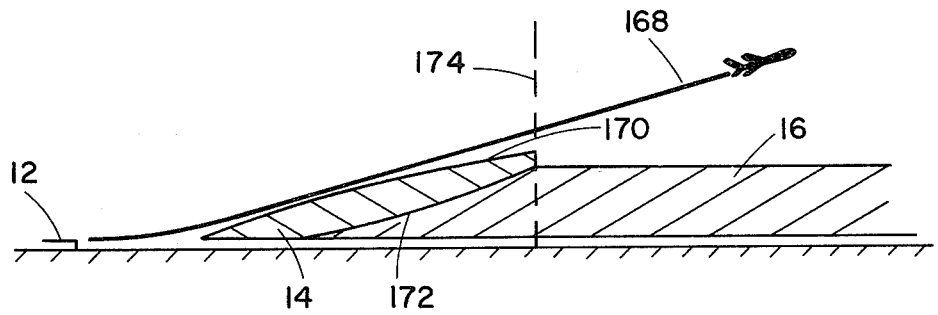
FIG. 6 is a graphical representation of the aircraft flight path of FIG. 1 illustrating a ground proximity warning system with mode switching based on radio altitude and time.

Operation of the ground proximity warning system utilizing time based altitude signals is illustrated by an aircraft flight path 168 over flat terrain shown in FIG. 6. As can be seen from FIG. 6 the loss of altitude, as indicated by line 170, required to generate a negative climb after take-off type warning such as "don't sink" 14, increases with increasing radio altitude $h_R$ and time. Similarly the radio altitude at which the terrain clearance warning "too low" 16 is given increases as a function of both increasing radio altitude $h_R$ and time as indicated by line 172. When the aircraft reaches the combination of radio altitude and elapsed time from take-off as denoted by the dashed line 174, the negative climb after take-off warning 14 is deactivated by the signals on lines 92 and 128 of FIG. 5 as described above and the terrain clearance warning 16 is established as the active warning mode with the warning altitude based on airspeed. It is preferable to set the various scale factors of the logic and circuit elements of the circuit shown in FIG. 5 such that the time based altitude signal on line 154 does not significantly bias the altitude loss $\Delta h_B$ required to generate the negative climb after take-off warning until the aircraft has accumulated sufficient feet-seconds of radio altitude as measured by the time based altitude signal on line 116 so that the terrain clearance floor 172 is sufficiently high to afford adequate protection for the aircraft.

Figure 7:
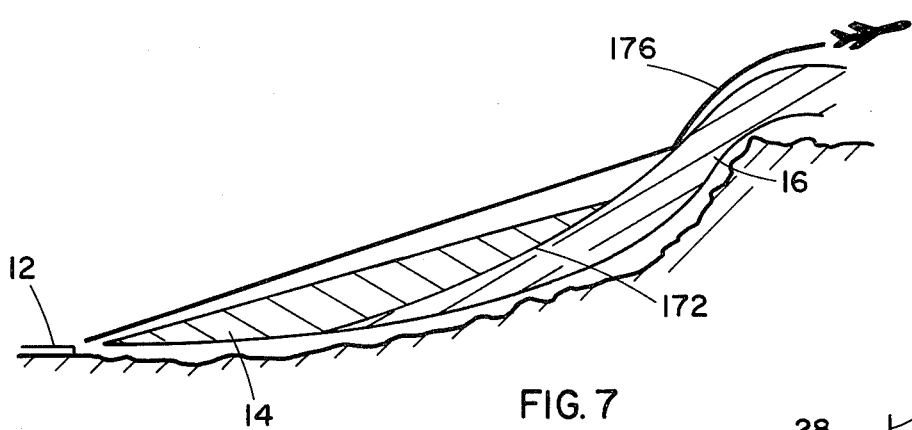
FIG. 7 is a graphical representation of the aircraft flight path of FIG. 2 illustrating the operation of a ground proximity warning system with mode switching based on radio altitude and time.

An example of enhanced protection provided by the system of FIG. 5, is shown by a flight path 176 in FIG. 7 which corresponds generally to the flight path 20 in FIG. 2. In this case the increasing terrain clearance floor 172 will result in a warning even though the aircraft has not achieved the 700 feet of radio altitude as required in the system of FIG. 2. This protection is available where the terrain slopes upward right after take-off and the aircraft does not descend with respect to barometric altitude.

Figure 8:
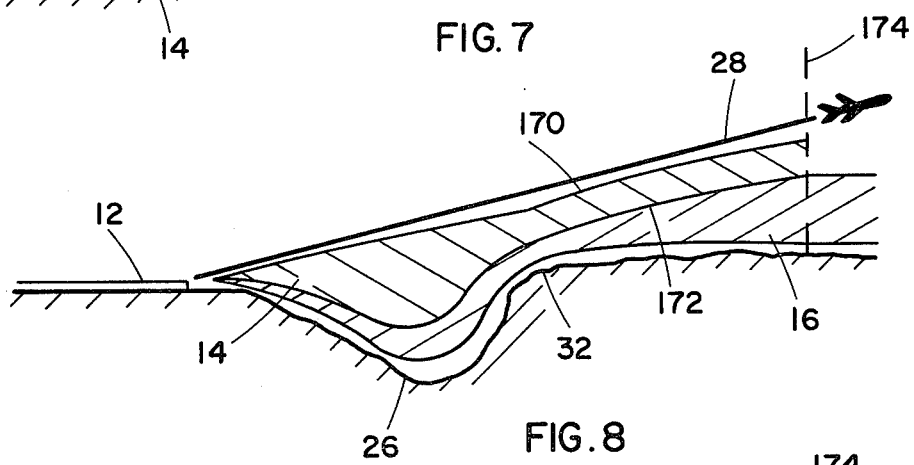
FIG. 8 is a graphical representation of the aircraft flight path of FIG. 3 illustrating the operation of a ground proximity warning system with mode switching based on radio altitude and time.
Figure 9:
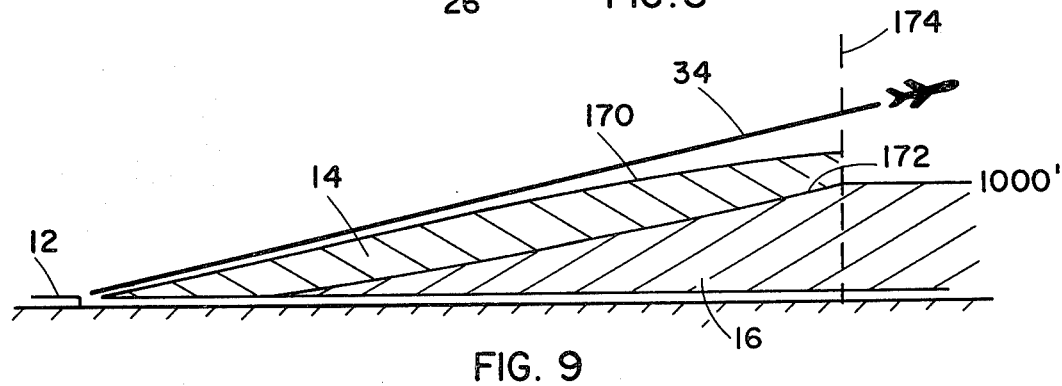
FIG. 9 is a graphical representation of the aircraft flight path of FIG. 4 illustrating the operation of a ground proximity warning system with mode switching based on radio altitude and time.

Elimination of the type of nuisance warnings illustrated in FIGS. 3 and 4 is also provided. As shown in FIGS. 8 and 9, a dip in the terrain or acceleration to 0.45 mach will not result in unwanted warnings because the ground proximity warning system does not switch from the negative climb after take-off mode to the terrain clearance mode at 700 feet of radio altitude as in the prior art systems.

Although the preferred embodiment of the invention as shown in the block diagram of FIG. 5 was discussed in terms of an analog system, it is apparent that the logic shown and described herein could readily be used to program a digital computer for implementing a ground proximity warning system having time and altitude based mode switching.

I claim:

1. A ground proximity warning system for aircraft comprising:
   a source of signals representing aircraft flight parameters;
   a source of a signal representing aircraft radio altitude;
   means responsive to said radio altitude signal for generating a time based altitude signal that increases as a function of increasing radio altitude and time;
   a first warning mode means responsive to said flight parameter signals and said radio altitude signal for generating a warning signal in accordance with a first predetermined relationship between flight parameters;
   a second warning mode means responsive to said flight parameter signals and said radio altitude signal for generating said warning signal in accordance with a second predetermined relationship between flight parameters; and
   means operatively connected to said first and said second warning mode means and responsive to said time based altitude signal for deactivating said first warning mode means.

2. The system of claim 1 wherein said source of flight parameter signals includes a source of barometric altitude signals;
   wherein said first warning mode means generates said warning signal according to said first predetermined relationship when the aircraft is descending with respect to barometric altitude below a first predetermined radio altitude; and
   wherein said second warning mode means generates said warning signal according to said second predetermined relationship when the aircraft descends below a second predetermined radio altitude.

3. The system of claim 2 wherein said deactivating means deactivates said first warning mode means when said time based altitude signal exceeds a predetermined value.

4. The system of claim 2 wherein said source of flight parameter signals includes a source of signals representing aircraft configuration and wherein said system includes means responsive to said configuration signals for generating a signal indicating that the aircraft is in a take-off phase of flight and means for activating said first warning mode means and said time based altitude signal generating means in response to said take-off signal.

5. The system of claim 4 wherein said activating means is also responsive to said radio altitude signal for starting said time based altitude signal when the aircraft exceeds a predetermined minimum radio altitude.

6. The system of claim 5 wherein said source of flight parameter signals includes a source of airspeed signals and wherein said deactivating means is responsive to said airspeed signal to increase said predetermined value of said time based altitude signal as a function of increasing airspeed.

7. The system of claim 2 including means for varying said second predetermined radio altitude as a function of said time based altitude signal.

8. The system of claim 2 wherein said second predetermined radio altitude is approximately equal to seventy-five percent of the maximum radio altitude achieved by the aircraft.

9. The system of claim 7 including means for switching said second predetermined radio altitude to a value independent of said time based altitude signal when said first warning mode is deactivated.

10. A ground proximity warning system for aircraft comprising:
   a source of signals representing aircraft flight parameters;
   a source of a signal representing aircraft radio altitude;
   means responsive to said radio altitude signal for generating a time based altitude signal that increases as a function of increasing radio altitude and time;
   means responsive to said flight parameter signals and said radio altitude signal for generating a warning signal in accordance with a predetermined relationship between said flight parameters and radio altitude; and
   means responsive to said time based altitude signal and operatively connected to said warning signal generating means for varying as a function of said time based altitude signal said predetermined relationship.

11. The system of claim 10 wherein said source of flight parameter signals includes a source of barometric altitude signals and said predetermined relationship will result in the generation of said warning signal when the aircraft is descending with respect to barometric altitude when the aircraft is below a predetermined radio altitude and wherein said varying means effectively increases the amount of barometric altitude loss required to generate said warning signal as a function of said time based altitude signal.

12. The system of claim 10 wherein said warning signal generating means generates said warning signal when the aircraft descends below a predetermined radio altitude and wherein said varying means increases said predetermined radio altitude as a function of an increase in said time based altitude signal.

13. The system of claim 10 wherein said time based altitude signal means includes means responsive to said radio altitude signal for starting said time based altitude signal when the aircraft has exceeded a predetermined minimum radio altitude.

14. The system of claim 13 wherein said source of flight parameter signals includes a source of signals representing aircraft configuration and wherein said system includes means responsive to said configuration signals for generating a signal indicating that the aircraft is in a take-off phase of flight and wherein said time based altitude signal starting means responds to said phase of flight signal such that said time based altitude signal is started during the take-off phase of flight when the aircraft exceeds said predetermined minimum altitude.

15. The system of claim 10 wherein said source of flight parameter signals includes a source of aircraft configuration signals and said time based altitude signal means includes means responsive to said configuration signals for starting said time based altitude signal when the aircraft is in a predetermined configuration.

16. The system of claim 15 wherein said time based altitude signal means starts said time based altitude signal in response to both said configuration signal and a predetermined minimum radio altitude.

17. The system of claim 12 wherein said varying means increases said predetermined radio altitude from a minimum altitude to a maximum altitude in response to said time based altitude signal.

18. The system of claim 17 wherein said minimum altitude is 50 feet.

19. The system of claim 17 wherein said maximum altitude is 500 feet.

20. The system of claim 17 wherein said maximum is 1000 feet.

21. The system of claim 17 wherein said source of flight parameter signals includes a source of airspeed signals and wherein said varying means increases said maximum altitude as a function of increasing airspeed.

22. The system of claim 17 wherein said predetermined radio altitude is approximately equal to seventy-five percent of the maximum radio altitude gained by the aircraft.

23. The system of claim 12 wherein said source of flight parameter signals includes a source of barometric altitude signals and said warning signal generating means generates said warning signal when the aircraft is descending with respect to barometric altitude when the aircraft is below a second predetermined radio altitude and wherein said varying means reduces said second predetermined radio altitude as said time based altitude signal increases.

24. The system of claim 10, 11 or 23 wherein time based altitude signal means includes means for integrating said radio altitude signal overtime to generate said time based altitude signal.

25. The system of claim 10, 13, 14, 15, 16, 17, 18, 19, 20, 21 or 22 wherein said time based altitude signal means includes means for multiplying said radio altitude signal by a predetermined gain factor.

26. A ground proximity warning system for aircraft comprising:
   a source of signals representing aircraft configurations;
   a source of a signal representing radio altitude;
   a source of a signal representing barometric altitude;
   means responsive to said radio altitude signal for generating time based altitude signals that increases as a function of both time and radio altitude;
   means responsive to said configuration signals and said radio altitude signals for generating a signal indicating aircraft phase of flight;

a first warning means responsive to said radio altitude signal, said barometric altitude signal, said time based altitude signal and said phase of flight signal for generating a first warning signal when the aircraft is in a take-off phase of flight and is descending with respect to barometric altitude below a first predetermined radio altitude and including means responsive to said time based altitude signal to effectively decrease said first predetermined radio altitude as a function of said time based altitude signals; and a second warning means responsive to said radio altitude signal and said time signal for generating a second warning signal when the aircraft descends below a second predetermined radio altitude including means responsive to said time based altitude signals for increasing said second predetermined radio altitude as a function of said time based radio altitude signal.

27. The system of claim 26 including means responsive to said phase of flight signal for starting said time based altitude signals during take-off.

28. The system of claim 26 additionally including a source of a signal representing aircraft speed and means responsive to said speed signal to increase said second predetermined radio altitude as a function of time.

29. The system of claim 28 wherein said second predetermined radio altitude increases to a maximum value of 1000 feet.

30. The system of claim 26 wherein said second warning means includes means for generating said second predetermined radio altitude independent of said time based altitude signal when said time based altitude signal exceeds a predetermined value.

31. The system of claim 30 wherein said first warning means is deactivated when said time based altitude signal exceeds said predetermined value.

32. The system of claim 31 including a source of airspeed signals and means operatively connected to said first and second warning means and responsive to said airspeed signal to increase said predetermined time based altitude signal value as a function of airspeed.

* * * * *